US009829399B2

(12) United States Patent
Schwenker

(10) Patent No.: US 9,829,399 B2
(45) Date of Patent: Nov. 28, 2017

(54) TRANSMISSION FOR MINIATURE DRIVE HAVING A TORQUE MEASURING ELEMENT

(71) Applicant: Dr. Fritz Faulhaber GmbH & Co. KG, Schönaich (DE)

(72) Inventor: Frank Schwenker, Kirchheim unter Teck (DE)

(73) Assignee: DR. FRITZ FAULHABER GMBH & CO. KG, Schönaich (DE)

( * ) Notice: Subject to any disclaimer, the term of this patent is extended or adjusted under 35 U.S.C. 154(b) by 0 days.

(21) Appl. No.: 15/180,166

(22) Filed: Jun. 13, 2016

(65) Prior Publication Data
US 2016/0377494 A1 Dec. 29, 2016

(30) Foreign Application Priority Data
Jun. 26, 2015 (DE) .................. 10 2015 110 353

(51) Int. Cl.
| | | |
|---|---|---|
| *G01L 1/12* | (2006.01) | |
| *G01L 3/10* | (2006.01) | |
| *G01L 5/24* | (2006.01) | |
| *F16H 1/28* | (2006.01) | |

(52) U.S. Cl.
CPC ............ *G01L 3/101* (2013.01); *F16H 1/28* (2013.01); *G01L 5/24* (2013.01)

(58) Field of Classification Search
CPC ............ G01L 3/101; G01L 5/24; F16H 1/28
USPC ..................................... 73/862.69
See application file for complete search history.

(56) References Cited

U.S. PATENT DOCUMENTS

| | | | |
|---|---|---|---|
| 6,694,828 B1 | 2/2004 | Nicot | |
| 2007/0299427 A1* | 12/2007 | Yeung | ............ B25J 9/047 606/1 |
| 2010/0234967 A1* | 9/2010 | Whiteley | ............ H02K 7/116 623/24 |

(Continued)

FOREIGN PATENT DOCUMENTS

| | | |
|---|---|---|
| AT | 008 935 U1 | 2/2007 |
| DE | 10 2006 054 179 A1 | 5/2008 |

(Continued)

OTHER PUBLICATIONS

German Examination Report—Apr. 7, 2016.
European Search Report—Nov. 7, 2016.

*Primary Examiner* — Max Noori
(74) *Attorney, Agent, or Firm* — Brinks Gilson & Lione

(57) ABSTRACT

A transmission (3) for an electric miniature drive or microdrive, having a transmission housing (9), an attachment flange (13) for attaching the transmission (3) to an application or load, a driven shaft (7), supported in at least one driven bearing (8), for driving the application. The driven shaft (7) is connectable via the transmission mechanism to the miniature drive or microdrive, and a torque measuring member (15) for the registration of the torque generated on the driven shaft (7) using a flexible element during operation of the miniature drive or microdrive. A magnetic encoder system (19) is disposed on the flexible element (17), which has a magnetic field measuring element (25) for measuring a rotatory displacement of the flexible element (17). The flexible element (17) is disposed axially between the transmission mechanism and the attachment flange (13).

17 Claims, 4 Drawing Sheets

(56) References Cited

U.S. PATENT DOCUMENTS

2011/0071671 A1* 3/2011 Ihrke .................. B25J 17/0258
       700/245

FOREIGN PATENT DOCUMENTS

| DE | 10 2008 003 026 A1 | 8/2008 |
| DE | 10 2012 210 578 A1 | 12/2013 |
| DE | 10 2014 202 735 A1 | 8/2014 |
| EP | 1 719 991 A1 | 11/2006 |

* cited by examiner

TRANSMISSION FOR MINIATURE DRIVE HAVING A TORQUE MEASURING ELEMENT

CROSS-REFERENCE TO RELATED APPLICATION

This application claim priority to German Application No. 10 2015 110 353.2, filed Jun. 26, 2015.

FIELD OF THE INVENTION

The invention relates to a transmission for an electrical miniature drive or microdrive, having a transmission housing, wherein a transmission mechanism is disposed, an attachment flange for attaching the transmission to an application, a driven shaft, supported in at least one driven bearing, for driving the application, wherein the driven shaft is configured connectable to the miniature drive or microdrive via the transmission mechanism, and a torque measuring member for the registration of the torque generated at the driven shaft by means of a flexible element during the operation of the miniature drive or microdrive.

BACKGROUND

In the sense of the invention, miniature drives or microdrives are electrical drives having a continuous output of at most 1000 W.

Transmissions for electrical miniature drives or microdrives in particular lead to a multiplication of the torque generated by the motor at the transmission output with the simultaneous reduction of the output rotational speed by a reduction ratio. Due to losses from friction, the influence of the reduction ratio as well as the transmission self-locking effect resulting therefrom, the torques acting at the output are not always transmitted to the motor in proportion to the reduction. Conclusions as to the torque generated at the transmission output can thus not always be directly arrived at by means of a measurement of the motor torque. In order to, nevertheless, determine it, the output torque can be measured.

Torques can be measured, for example, by determining the resulting deformation of elastic regions of the flexible element. In this case, the measurement of the deformation directly at the moved driven shaft is very complex, particularly in precision dimensions due to the narrow spatial conditions. A measurement of the reaction torque circumvents the need to transmit information to and from moved parts. Strain gauges are very often used for the measurement of forces, torques, and the deformations resulting therefrom.

For example, a torque measuring member having strain gauges for a planetary transmission device is known from DE 10 2006 057 539 A1. Due to the very small changes in the electrical properties, special evaluation electronics having measurement amplifiers are necessary, which as a rule require the signals from a plurality of strain gauges. The strain gauges must be firmly applied to the deforming element and electrically contacted. In addition to the installation complexity, the accessibility, in particular for mounting the sensors, is problematic under narrow spatial conditions.

The object of the invention is to provide a transmission having a torque measuring member for measuring the torque at the driven shaft, which torque measuring member is configured particularly small and compact, is simple and cost-effective to manufacture and to install, and can be used in a flexible manner.

The object is inventively achieved by the features of the invention described herein. Since a magnetic encoder system is disposed on the flexible element, which magnetic encoder system has a magnetic field generating element and a magnetic field measuring element for measuring a rotatory deflection of the flexible element, wherein the flexible element is disposed axially between the transmission mechanism and the attachment flange, a particularly compact design is made possible. In particular, the use of a magnetic encoder system allows a precise registration of the torque at little expense and simpler installation.

In an advantageous embodiment of the invention, the flexible element circumferentially encloses the driven shaft, wherein it transforms a torque generated at the driven shaft into a rotatory deflection of the flexible element. In particular, the flexible element includes at least three struts extending axially parallel to the driven shaft. In this case, it is particularly advantageous if the flexible element, in particular its struts, has a radial height that is at least twice as large as the tangential thickness of the flexible element, in particular of its struts. The flexible element, in particular its struts, advantageously has an axial length that is at least four times as large as the tangential thickness of the flexible element, in particular of its struts. As a result of such a design, a high rigidity, thus insensitivity with respect to radial disruptive forces, and a low rigidity, thus high sensitivity to rotational torques is achieved.

In one embodiment of the present invention, the torque measuring member, the attachment flange, and the driven bearing flange form a modular functional subassembly, which can be assembled independently of a transmission housing with the transmission mechanism and the driven shaft and is configured as an assembled part that can be placed on the driven shaft. The flexible element and the attachment flange are preferentially configured in one piece. In particular, the driven bearing flange includes at least two driven bearings, wherein one or two driven bearings are disposed axially inside the flexible element. This further reduces the installation space and simplifies the assembly of the transmission.

In a further advantageous embodiment, the magnetic encoder system is disposed in the intermediate space of the struts of the flexible element. In particular, the magnetic encoder system is disposed on the flexible element such that in the event of a rotatory deflection of the flexible element, the magnetic field generating element is displaced tangentially with respect to the magnetic field measuring element.

In particular, the magnetic field generating element is advantageously disposed radially, axially, or tangentially spaced on the flexible element, wherein the magnetic field generating element is disposed on a first partial element of the flexible element, which first partial element is connected to a first axial extremity of the flexible element, and the magnetic field measuring element is disposed on a second partial element of the flexible element, which second partial element is connected to an opposing second axial extremity of the flexible element.

Furthermore it is advantageous, if a mechanical overload protection is disposed between the struts of the flexible element. In this case, the overload protection is configured in particular as a mechanical stop, wherein the stop acts between the one and the other axial side of the flexible element and thus acts against too far a rotation in the event of large drive torques.

BRIEF DESCRIPTION OF THE DRAWINGS

Further advantageous designs of the invention will be apparent from the following Figure descriptions.

DETAILED DESCRIPTION

Figure 1:
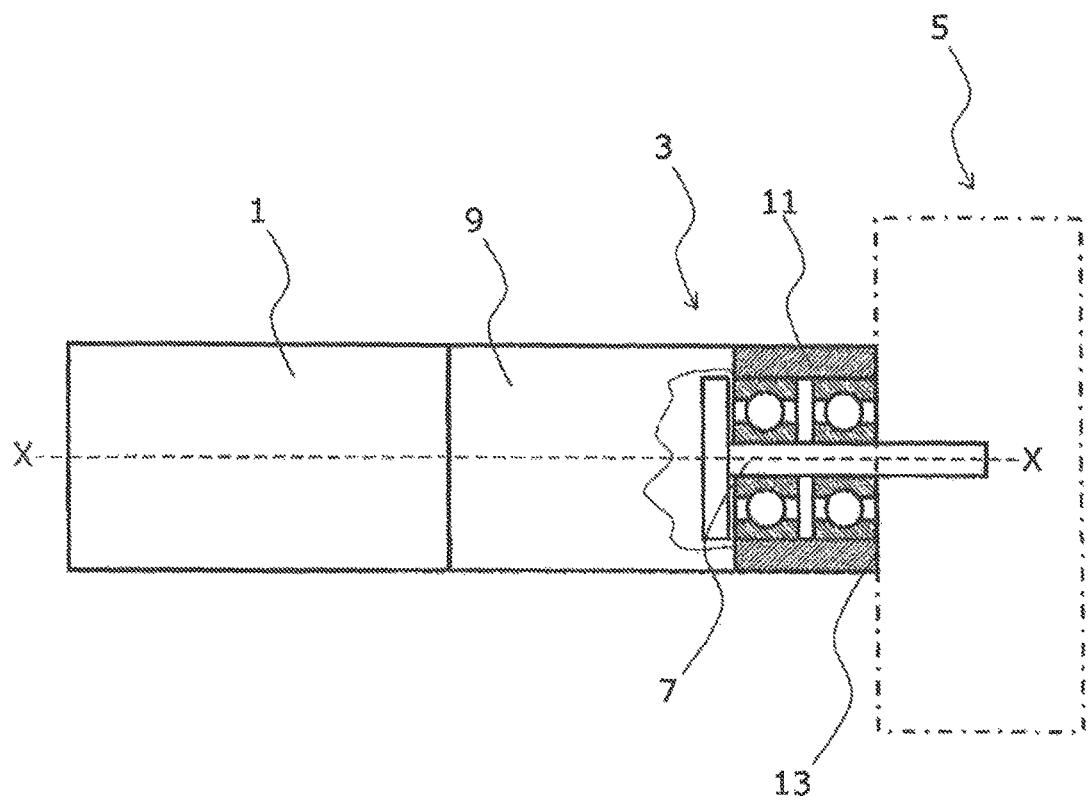
FIG. 1 is a schematic view of a use of an electric microdrive having a connected transmission and indicated application.

In the various Figures of the drawings, identical parts are designated with the same reference numeral.

For the subsequent description the invention is not limited to the exemplary embodiments and thus not to all or a plurality of features of described feature combinations, rather each individual partial feature of the/of each exemplary embodiment is also fundamental to the subject matter of the invention independently of all other partial features as such described in connection therewith and also in combination with any features of another exemplary embodiment.

FIG. 1 shows a schematic view of an exemplary use of a miniature drive or microdrive 1 having a connected transmission 3 for driving an application (or load) 5 indicated by dashed lines via a driven shaft 7 of the transmission 3. The transmission 3 can in particular be configured as a planetary transmission and includes a corresponding transmission mechanism, which is not shown, which is preferentially disposed in a transmission housing 9. The driven shaft 7 is supported in particular by two driven bearings 8 and can be connected via the transmission mechanism to a driven shaft, which is not shown, of the miniature drive or microdrive 1. The driven bearings 8 are disposed in a driven-bearing flange 11. On the end side facing the application 5, the driven-bearing flange 11 forms an attachment flange 13 of the transmission 3. By means of the attachment flange 13, the transmission 3 can be connected to the application 5, in particular to a housing of the application 5. The driven-bearing flange 11 and the attachment flange 13 are in particular configured in one piece.

Figure 2:
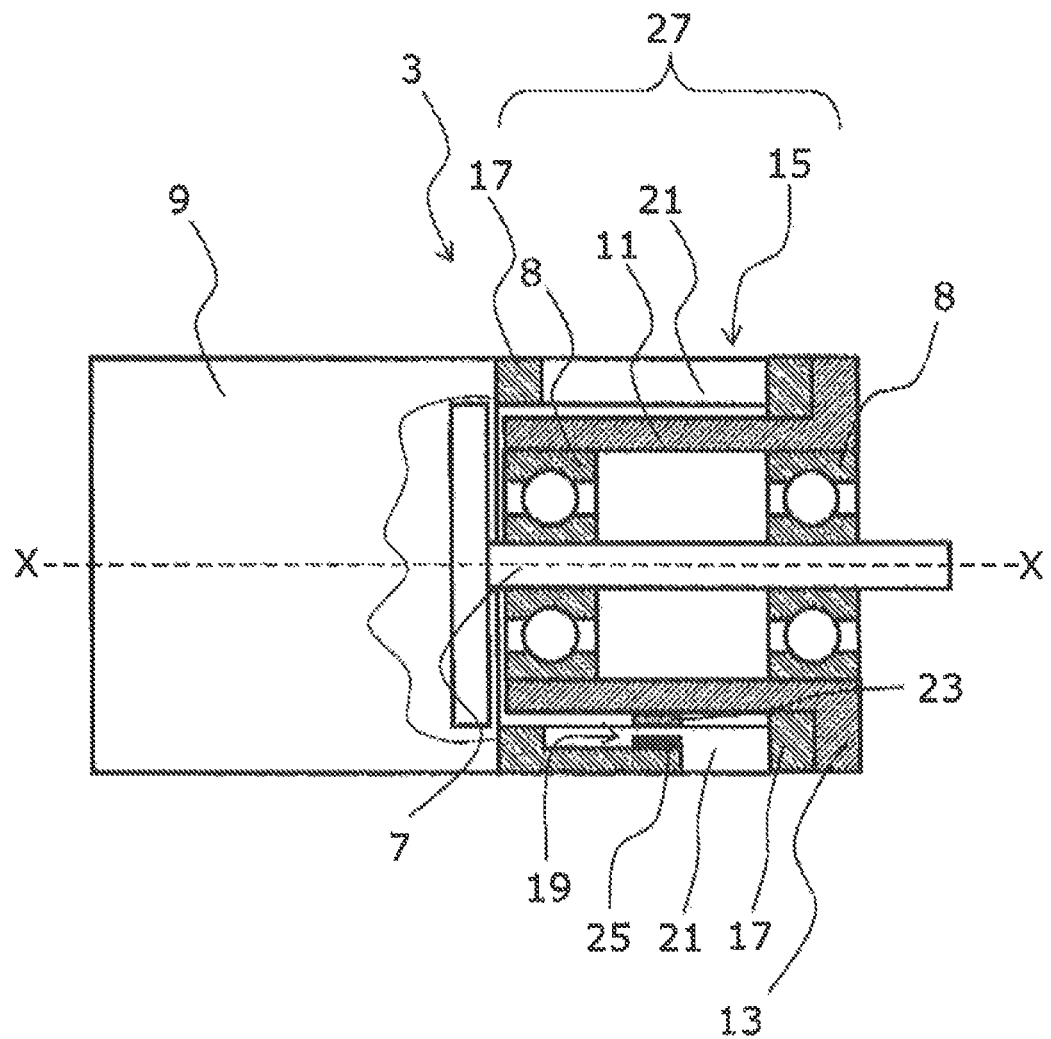
FIG. 2 is a schematic view of a partial section through a first embodiment of an inventive transmission having a torque measuring member.

FIG. 2 shows a schematic view of a partial section through a first embodiment of an inventive transmission 3 having a torque measuring member 15 for determining the torque generated at the driven shaft 7 during the operation of the miniature drive or microdrive 1. The torque measuring member 15 is in particular configured in a cage-type manner.

The torque measuring member 15 includes at least one flexible element 17 and one magnetic encoder system 19 disposed on the flexible element 17 for measuring a rotatory displacement of the flexible element 17. The flexible element 17 is preferentially disposed axially between the transmission mechanism or the transmission housing 9 and the attachment flange 13. In particular, the flexible element 17 circumferentially encloses the driven shaft 7, wherein it transforms a torque generated on the driven shaft 7 into a rotatory displacement of the flexible element 17. This makes possible a measuring of the supporting reaction torque, which is transmitted via the driven shaft 7 and the transmission housing 9 and the transmission mechanism to the flexible element 17.

In a preferred embodiment, at least two driven bearings 8 are disposed in the driven-bearing flange 11, wherein at least one, preferentially two driven bearings 8 are disposed axially inside the flexible element 17.

Alternatively or additionally, it can also be particularly advantageous, if a driven bearing 8 is disposed axially in front of the flexible element 17 and a further driven bearing 8 is disposed axially behind the flexible element 17.

In a particular embodiment of the torque measuring member 15, the flexible element 17 are in the form of struts 21 extending axially parallel to the driven shaft 7, preferentially more than two struts 21. In particular, the arrangement of the struts 21 or groups of struts 21 of the flexible element 17 is disposed uniformly distributed on the circumference of the driven shaft 7. In this case, it is particularly advantageous, if the spacing of the struts 21 of the flexible element 17 inside a group of struts 21 is smaller than the distance of the struts 21 of a group of struts 21 to the next group of struts 21.

The flexible element 17, in particular the struts 21, is advantageously is made of a material having a yield strength $R_E \geq N/mm^2$ and/or an elasticity limit $\sigma_E \geq 450$ N/mm$^2$.

The magnetic encoder system 19 is advantageously disposed in the intermediate space of the struts 21 of the flexible element 17. The magnetic encoder system includes, in particular, a magnetic field generating element 23 (such as a permanent magnet) and a magnetic field measuring element 25. The magnetic field measuring element 25 is advantageously a Hall sensor or an MR sensor.

In one embodiment of the invention, it is particularly advantageous, if the magnetic encoder system and the flexible element are configured such that the following condition is fulfilled:

$$0.02 \leq \left| \frac{C_{Torsion} * \Delta Phi_{Sensor}}{2 * M_{Transmission}} \right| \leq 50$$

In this case, $M_{Transmission}$ is the continuous torque of the transmission 3, which can be briefly exceeded in operation. $U_{Sensor}$ is an output signal of the magnetic field measuring element 25 with $U_{SensorMax}$ and $U_{SensorMin}$ corresponding to maximum and minimum values. Phi(U) is an angular position of the magnetic field measuring element 25 depending on the output signal $U_{Sensor}$. The range of the displacement of the angular position of the magnetic field measuring element 25 $\Delta Phi_{Sensor}$ between the minimum and the maximum of the output signal of the magnetic field measuring element 25 results from:

$$\Delta Phi_{Sensor} = Phi(U_{SensorMax}) - Phi(U_{SensorMin}).$$

The average torsion spring rate $C_{Torsion}$ of the flexible element 17 results from the change of the torque AM and the corresponding change of the angular position $\Delta Phi$ according to the formula:

$$C_{Torsion} = \Delta M / \Delta Phi.$$

As an exemplary embodiment, an inventive transmission 3 can have a continuous torque $M_{Transmission} = 0.2$ Nm, wherein the magnetic field measuring element 25 has a range of displacement of the angular position $\Delta Phi_{Sensor} = 3.3°$ and the flexible element has a torsion spring rate $C_{Torsion} = 1.2$ Nm/°. For this exemplary embodiment the characteristic value is:

$$\left| \frac{C_{Torsion} * \Delta Phi_{Sensor}}{2 * M_{Transmission}} \right| = 9.9.$$

In a possible embodiment, the magnetic field generating element 23 is advantageously disposed spaced apart in the radial direction from the magnetic field measuring element 25. Alternatively, the arrangement could be configured axially or tangentially spaced. In this case, the magnetic field generating element 23 can be disposed in particular on the outer circumference of the driven-bearing flange 11, and the magnetic field measuring element 25 can be disposed on the inner circumference of the flexible element 17.

The magnetic field generating element 23 is advantageously disposed on a first partial element of the flexible element 17, which is connected to a first axial extremity of the flexible element 17, in particular to the end side facing the attachment flange 13, and the magnetic field measuring element 25 is disposed on a second partial element of the flexible element 17, which second partial element is connected to an opposing second axial extremity of the flexible element 17, in particular to the end side facing the transmission 3.

In an alternative or additional design, the magnetic field generating element 23 can be disposed spaced apart in the axial direction X-X from the magnetic field measuring element 25. In this case, the magnetic field generating element 23 and the magnetic field measuring element 25 can be disposed axially, preferentially respectively on opposite extremities of the flexible element 17.

In particular the magnetic field generating element 23 and the magnetic field measuring element 25 are disposed in the torque measuring member such that in the event of a rotatory displacement of the flexible element 17, the magnetic field generating element 23 is displaced, in particular tangentially, with respect to the magnetic field measuring element 25.

The magnetic field generating element 23 advantageously generates a two-pole field in the direction of the magnetic field measuring element 25, wherein the magnetic poles are disposed tangentially to the driven shaft 7.

In an advantageous embodiment, the magnetic field generating element 23 is disposed, in contrast to the magnetic field measuring element 25, radially outside on the flexible element 17. In this case, the magnetic field generating element 23 can advantageously be disposed in particular on an iron counterplate of the flexible element 17 and held in position by the magnetic forces.

In a further embodiment, a plurality of associated pairs of respectively a magnetic field generating element 23 and a magnetic field measuring element 25 are disposed on the flexible element 17. In this case, the respective associated pairs of magnetic field generating elements 23 and magnetic field measuring elements 25 are in particular each disposed in various intermediate spaces of the struts 21 of the flexible element 17.

At least one associated pair of a magnetic field generating element 23 and one magnetic field measuring element 25 are advantageously disposed in an intermediate space spaced apart tangentially over the circumference. Alternatively or additionally, at least one associated pair of a magnetic field generating element 23 and a magnetic field measuring element 25 are disposed in an intermediate space spaced apart in the axial direction X-X.

In a particularly advantageous embodiment, the torque measuring member 15 forms, with the flexible element 17 and the magnetic encoder system 19, together with the attachment flange 13 and with the driven-bearing flange 11, a modular functional subassembly 27, which can be assembled with the transmission mechanism and the driven shaft 7 independently of the transmission housing 9 and is configured as an assembled part that can be placed on the driven shaft 7.

Figure 3:
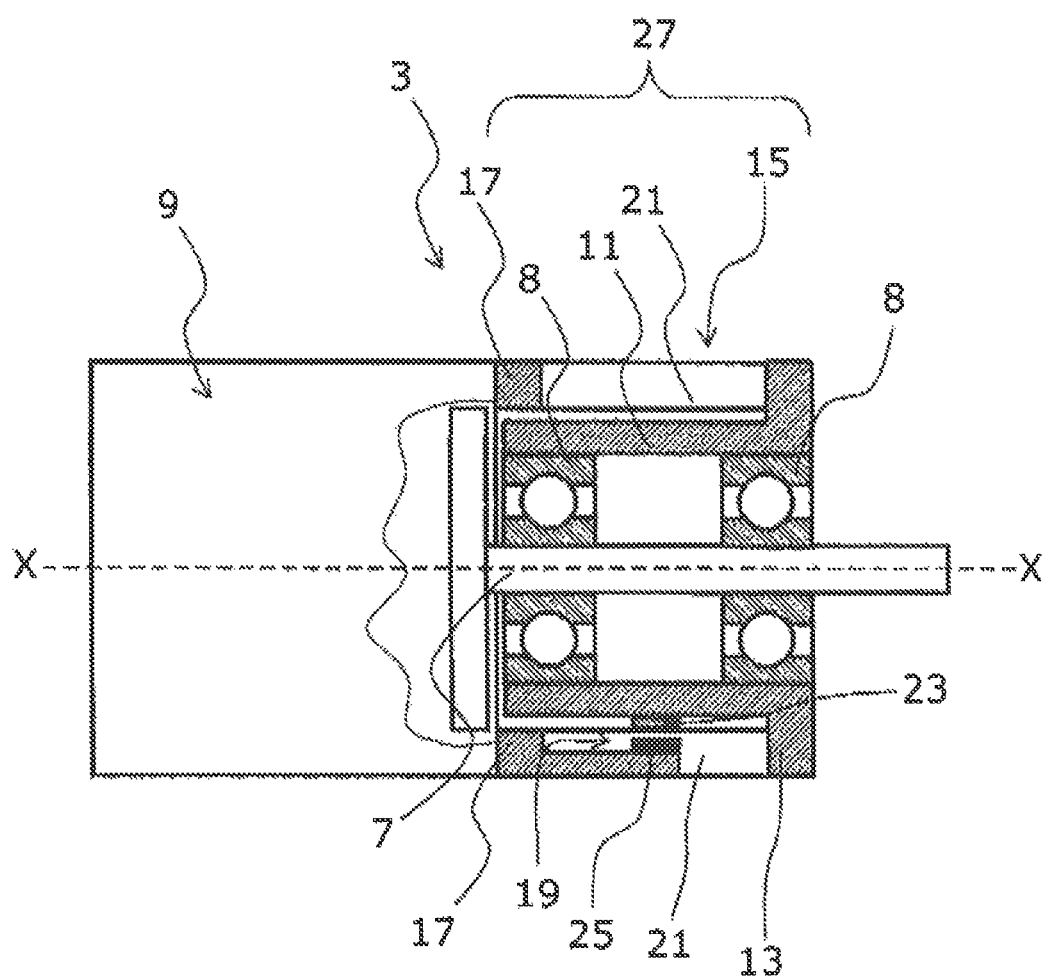
FIG. 3 is a schematic view of a partial section through a second embodiment of an inventive transmission having a torque measuring member.

FIG. 3 shows a schematic view of a partial section through a second embodiment of an inventive transmission having a torque measuring member 15. The flexible element 17 and the attachment flange 13 are advantageously configured in one piece.

In a further advantageous embodiment of the invention, a mechanical overload protection is disposed between the struts 21 of the flexible element 17. In particular, the overload protection is configured as a mechanical stop, wherein the stop acts between the one and the other axial side of the flexible element 17 and thus acts against too far a relative rotation in the event of too large drive torques.

Figure 4A:
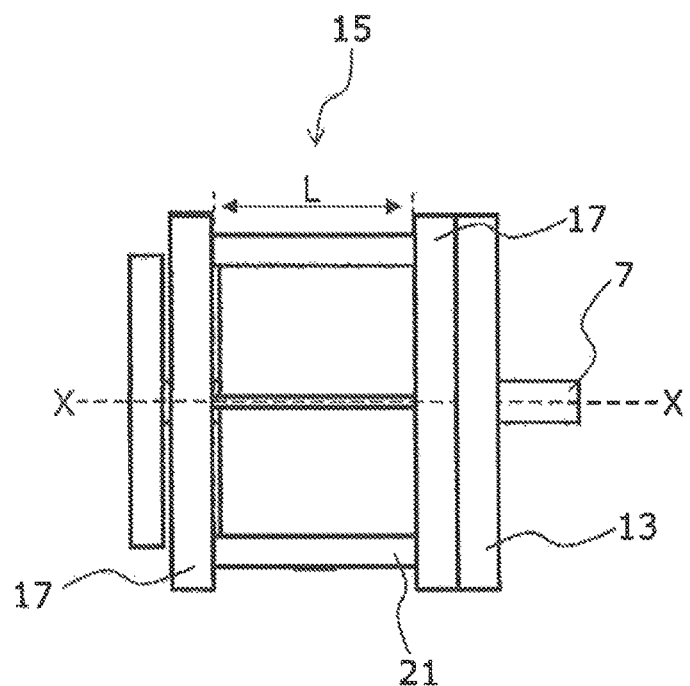
FIG. 4a is a schematic side view of a torque measuring member of an inventive transmission.
Figure 4B:
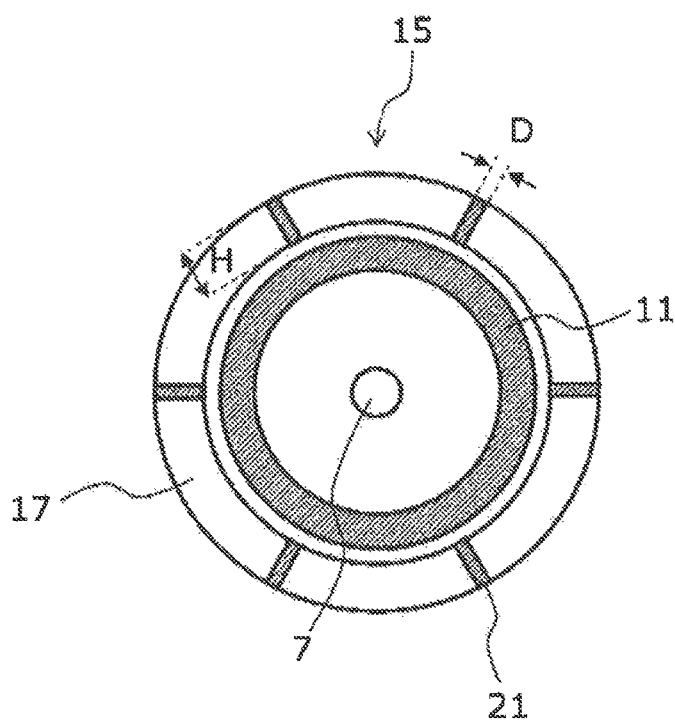
FIG. 4b is a schematic view of a cross-section through a flexible element of a torque measuring member of an inventive transmission.

FIG. 4a and FIG. 4b show a schematic view and a side view and cross-section of the torque measuring member 15 of an inventive transmission 3.

The flexible element 17, in particular its struts 21, advantageously has a length L that is at least four times as large as the tangential thickness D of the flexible element 17, in particular of the struts 21.

In a further embodiment, the flexible element 17, in particular its struts 21, has a radial height H that is at least twice as large as the tangential thickness D of the flexible element 17, in particular of the struts 21.

The invention is not limited to the shown and described exemplary embodiments, but also includes all identically functioning embodiments in the sense of the invention. It is expressly noted that the exemplary embodiments are not limited to all features in combination, but rather each individual partial feature can also have an inventive meaning in itself independently of all other partial features.

While the above description constitutes the preferred embodiment of the present invention, it will be appreciated that the invention is susceptible to modification, variation and change without departing from the proper scope and fair meaning of the accompanying claims.

The invention claimed is:

1. A transmission for an electric miniature drive or microdrive, comprising a transmission housing in which a transmission mechanism is disposed, an attachment flange for attaching the transmission to an application, a driven shaft for driving the application, the driven shaft is supported in at least one driven bearing, wherein the driven shaft is configured connectable via the transmission mechanism to the miniature or microdrive, and a torque measuring member for the registration of the torque acting on the driven shaft by means of a flexible element during operation of the miniature drive or microdrive, and a magnetic encoder system having a magnetic field generating element and a magnetic field measuring element for measuring a rotatory displacement of the flexible element, wherein the flexible element is disposed axially between the transmission mechanism and the attachment flange.

2. The transmission according to claim 1, the flexible element further comprises at least three struts extending axially parallel to the driven shaft.

3. A transmission according to claim 1, further comprising the flexible element has a radial height that is at least twice as large as a tangential thickness, and has an axial length that is at least four times as large as the tangential thickness.

4. A transmission according to claim 2, further comprising the magnetic encoder system is disposed in the intermediate space of the struts of the flexible element.

5. A transmission for an electric miniature drive or microdrive, comprising a transmission housing in which a transmission mechanism is disposed, an attachment flange for attaching the transmission to an application, a driven shaft for driving the application, the driven shaft is supported in at least one driven bearing, wherein the driven shaft is configured connectable via the transmission mechanism to the miniature or microdrive, and a torque measuring member for the registration of the torque acting on the driven shaft by means of a flexible element during operation of the miniature drive or microdrive, and a magnetic encoder system having a magnetic field generating element and a magnetic field measuring element for measuring a rotatory displacement of the flexible element, wherein the flexible element is disposed axially between the transmission mechanism and the attachment flange, the magnetic field generating element is disposed on the elastic element spaced apart from the magnetic field measuring element, wherein the magnetic field generating element is disposed on a first partial element of the flexible element, which first partial element is connected to a first axial extremity of the flexible element, and the magnetic field measuring element is disposed on a second partial element of the flexible element, which second partial element is connected to an opposing second axial extremity of the flexible element.

6. A transmission according to claim 1, further comprising the magnetic encoder system is disposed on the flexible element such that in the event of a rotatory displacement of the flexible element the magnetic field generating element is tangentially displaced with respect to the magnetic field measuring element.

7. A transmission according to claim 1, further comprising the magnetic field generating element generates a two-pole field in the direction of the magnetic field measuring element, wherein the magnetic poles are disposed tangentially to the driven shaft.

8. A transmission according to claim 1, further comprising the magnetic field generating element is disposed radially outside on the flexible element.

9. A transmission according to claim 1, further comprising the magnetic field generating element is disposed on an iron counterplate of the flexible element and held in position by magnetic forces.

10. A transmission according to claim 1, further comprising a plurality of respectively associated pairs of a magnetic field generating element and a magnetic field measuring element are disposed on the flexible element.

11. A transmission according to claim 1, further comprising the torque measuring member, the attachment flange, and a driven-bearing flange form a functional subassembly that is adapted to be assembled with the transmission mechanism and the driven shaft independently of the transmission housing and is configured such that it can be placed as an assembled part on the driven shaft.

12. A transmission according to claim 1, further comprising the flexible element and the attachment flange are configured in one piece.

13. A transmission for an electric miniature drive or microdrive, comprising a transmission housing in which a transmission mechanism is disposed, an attachment flange for attaching the transmission to an application, a driven shaft for driving the application, the driven shaft is supported in at least one driven bearing, wherein the driven shaft is configured connectable via the transmission mechanism to the miniature or microdrive, and a torque measuring member for the registration of the torque acting on the driven shaft by means of a flexible element during operation of the miniature drive or microdrive, and a magnetic encoder system having a magnetic field generating element and a magnetic field measuring element for measuring a rotatory displacement of the flexible element, wherein the flexible element is disposed axially between the transmission mechanism and the attachment flange, further comprising at least a first and a second driven bearings are disposed in the driven-bearing flange, wherein the first driven bearing is disposed axially in front of the flexible element, and the second driven bearing is disposed axially behind the flexible element.

14. A transmission for an electric miniature drive or microdrive, comprising a transmission housing in which a transmission mechanism is disposed, an attachment flange for attaching the transmission to an application, a driven shaft for driving the application, the driven shaft is supported in at least one driven bearing, wherein the driven shaft is configured connectable via the transmission mechanism to the miniature or microdrive, and a torque measuring member for the registration of the torque acting on the driven shaft by means of a flexible element during operation of the miniature drive or microdrive, and a magnetic encoder system having a magnetic field generating element and a magnetic field measuring element for measuring a rotatory displacement of the flexible element, wherein the flexible element is disposed axially between the transmission mechanism and the attachment flange, further comprising at least first and second driven bearings are disposed in the driven-bearing flange, wherein at least one of the first and second driven bearings is disposed axially inside the flexible element.

15. A transmission according to claim 2, further comprising a mechanical overload protection is disposed between the struts of the elastic element.

16. The transmission according to claim 15, further comprising the overload protection is configured as a mechanical stop, wherein the stop acts between the one and the other axial side of the flexible element and thus acts against too far a rotary displacement in the event of too large drive torques.

17. A transmission according to claim 1 further comprising the flexible element, the magnetic encoder system and the drive mechanism are configured such that the product of the average torsion spring rate ($C_{Torsion}$) of the flexible element with the range of the displacement of the angular position ($\Delta Phi_{Sensor}$) of the magnetic field measuring element divided by double the continuous torque ($M_{Transmission}$) of the transmission is in the range of 0.02 to 50.

* * * * *